United States Patent [19]

Sakai et al.

[11] 4,068,543
[45] Jan. 17, 1978

[54] HYDRAULIC TRANSMISSION CONTROL DEVICE

[75] Inventors: Toshimitsu Sakai, Okazaki; Mitsuo Kawai, Toyota; Kiyohumi Mizuno, Nagoya, all of Japan

[73] Assignees: Toyota Jidosha Kogyo Kabushiki Kaisha, Toyota; Aisin Seiki Kabushiki Kaisha, Kariya, both of Japan

[21] Appl. No.: 619,966

[22] Filed: Oct. 6, 1975

[30] Foreign Application Priority Data

May 30, 1975    Japan .................................. 50-64095

[51] Int. Cl.² ................................................. B60K 41/04
[52] U.S. Cl. .................................................... 74/866
[58] Field of Search .............................. 74/866, 336

[56] References Cited

U.S. PATENT DOCUMENTS

| 3,738,196 | 6/1973 | Kubo et al. ........................ 74/866 |
| 3,741,042 | 6/1943 | Ravenel ............................. 74/866 |
| 3,750,495 | 8/1973 | Shinito et al. ..................... 74/866 |
| 3,805,640 | 4/1974 | Schneider et al. ................. 74/866 |
| 3,913,325 | 10/1975 | Miyao et al. ........................ 60/431 |

Primary Examiner—Samuel Scott
Assistant Examiner—Wesley S. Ratliff, Jr.
Attorney, Agent, or Firm—Finnegan, Henderson, Farabow & Garret

[57] ABSTRACT

A control system for a power dividing type hydraulic transmission in which the motive power supplied from an engine is transmitted mechanically. Part of the motive power is converted to hydraulic power by hydraulic pump motors to obtain infinitely variable speed ratios. The transmission includes a hydraulic pressure control system that operates by the use of electrically controlled solenoid valves. The control system detects the rotational speeds of an input and an output shaft, and when the speed ratio between the shafts is smaller than the mode converting speed ratio, a first solenoid valve is operated to engage a first clutch. When the speed ratio is greater than the mode converting speed ratio, a second solenoid valve is operated to engage a second clutch. The engagement of the clutches is timed so that both clutches are not coincidentally disengaged.

10 Claims, 7 Drawing Figures

HYDRAULIC TRANSMISSION CONTROL DEVICE

FIELD OF THE INVENTION

This invention relates to a controlling mechanism for a power dividing type hydraulic transmission system for vehicles such as automobiles in which the motive power supplied from a motor is transmitted mechanically, with a part of such motive power being converted into hydraulic power by means of hydraulic pump motors, so as to obtain infinitely variable speed ratios.

BACKGROUND OF THE INVENTION

Generally, the hydraulic pump motors used for power dividing type hydraulic transmission systems are restricted in their size when they are used in automobiles, so that such motors are subject to certain limitations in use at high speeds. In order to obtain a widely variable speed range with the small-sized hydraulic pump motors at low-speed rotations, there has been proposed a so-called mode conversion system in which the speed ratio is changed by changing the engagement of the clutches from one to the other. In this type of system, the power transmitting side and the power receiving side of clutch means engaged at the time of changeover are synchronized to eliminate any disadvantages resulting from engagement under extreme operating conditions. The clutches are normally arranged to be operated by hydraulic pressure. Such a system is shown in U.S. Pat. No. 3,913,325 issued to T. Miyao and T. Sakai entitled "Output Split Type Hydrostatic Transmission." The clutch which is engaged in response to the application of hydraulic pressure is capable of disengaging almost simultaneously with the discharge of hydraulic pressure. By contrast, the clutch which is disengaged under no load is unable to immediately engage even if hydraulic pressure is supplied because the rise of hydraulic pressure is relatively slow. Therefore, if releasing of one of the clutches and engagement of the other clutch are performed simultaneously at the time of changeover of clutches, both clutches are momentarily brought into a released state, inducing a no-load neutral state in the transmission. This causes a sharp increase of rotational speed of the engine, ultimately causing various mechanical problems in both the engine and transmission.

SUMMARY OF THE INVENTION

The improvement of this invention provides a controlling mechanism for a hydraulic transmission system in which both of the clutches are prevented from being in the disengaged state during changeover. This prevents the occurrence of sharp and abrupt increases of the rotational speed in the engine driving the transmission.

The invention further provides an electro-hydraulically controlled, variable ratio, automotive transmission capable of shifting engagement between two clutches without an intervening neutral state.

Additional objects and advantages of the invention will be set forth in part in the description which follows, and in part will be obvious from the description or may be learned from practice of the invention. The advantages of the invention may be realized and attained by means of the instrumentalities and combinations particularly pointed out in the appended claims.

In accordance with the purpose of the invention as embodied and broadly described herein, the hydraulic transmission control system of the present invention comprises a differential gear set having a high speed transmission path and a low speed transmission path for coupling power from an input shaft to an output shaft, the gear set being operably connected to speed control means arranged to supply a selectively variable speed control input to the differential gear set to adjust the drive ratio thereof. The system further comprises first and second clutch means for coupling the speed control means to the gear set to control the drive ratio of the high and low speed transmission paths, respectively, and means for producing speed signals representative of the rates of rotation of the output shaft and input shaft. The system further comprises means responsive to the ratio of the speed signals for activating the engagement of one of the clutches and deactivating the engagement of the other of the clutches and means included in such responsive means for extending the engagement of the disengaging clutch until the other clutch is engaged.

Preferably, the responsive means includes a pulse producing means. The output of the pulse producing means reflects the relationship of the ratio of the two shafts to a predetermined value. One of the clutches is responsive to the pulse from the pulse producing means while the other clutch receives pulses through an inverter from the pulse producing means.

It is also preferred that the means for extending the engagement of the disengaging clutch include means for lengthening (delaying) the pulses from the pulse producing means and the inverting means.

It is further preferred that the responsive means also include a pair of voltage dividers for individually receiving the signals representative of the speeds of the output shaft and the input shaft with the pulse producing means comprising a comparator with each of its inputs driven by the voltage dividers.

The invention consists in the novel circuits, parts, constructions, arrangements, combinations and improvements shown and described. The accompanying drawings, which are incorporated in and constitute a part of this specification, illustrate one embodiment of the invention and, together with the description, serve to explain the principles of the invention.

DESCRIPTION OF THE PREFERRED EMBODIMENT

Figure 1:
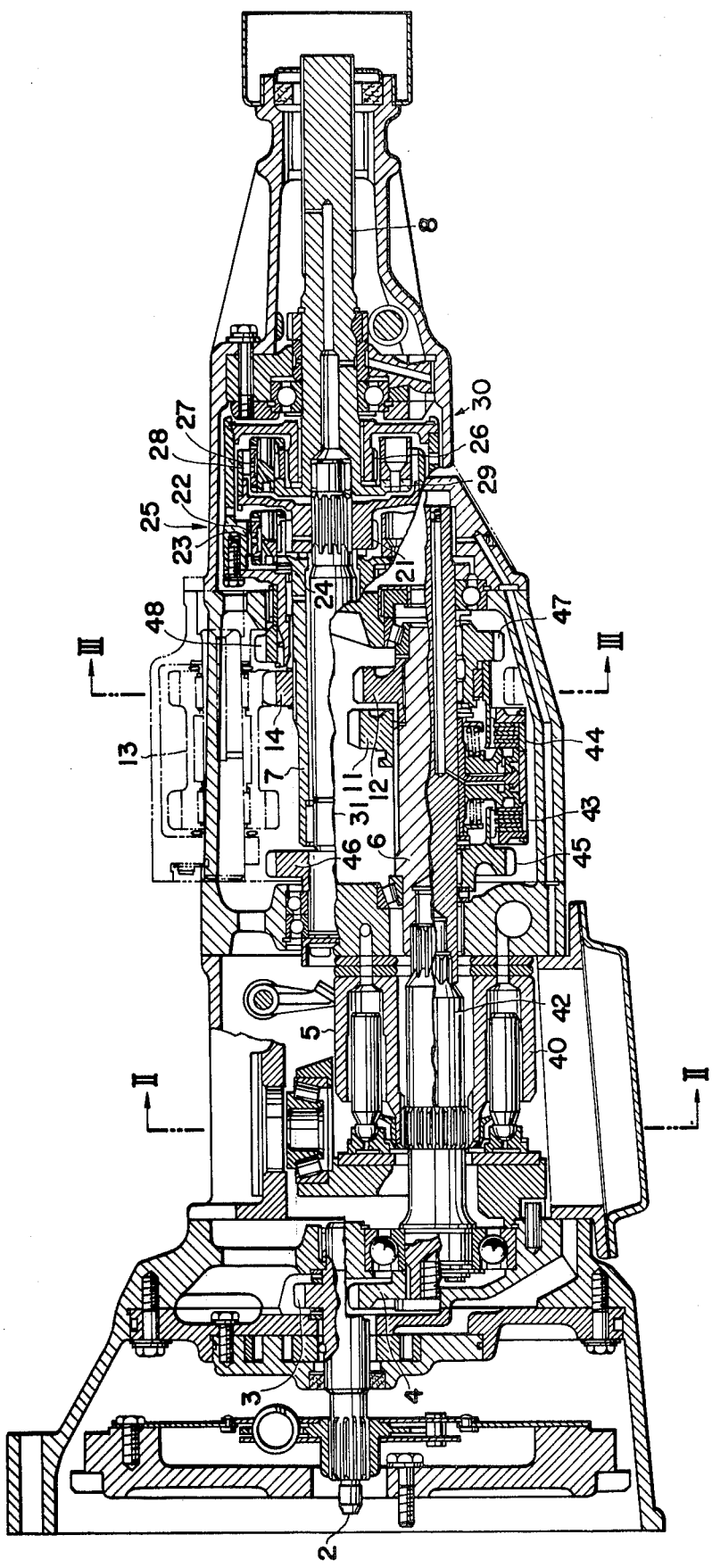
FIG. 1 is a sectional view of the preferred embodiment of a hydraulic transmission employing the present invention.
Figure 2:
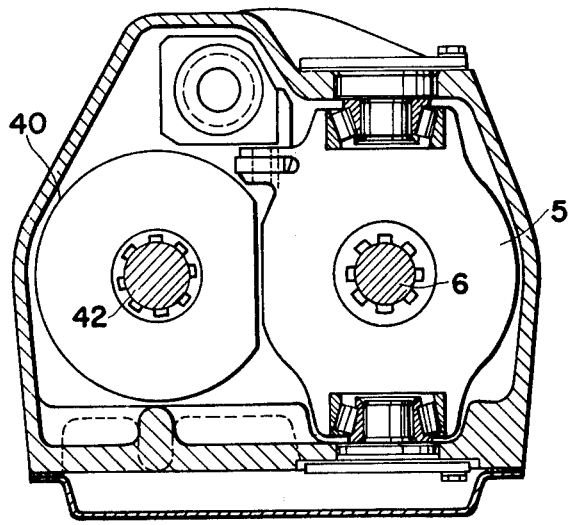
FIG. 2 is a sectional view of the embodiment of FIG. 1 taken along the line II—II.
Figure 3:
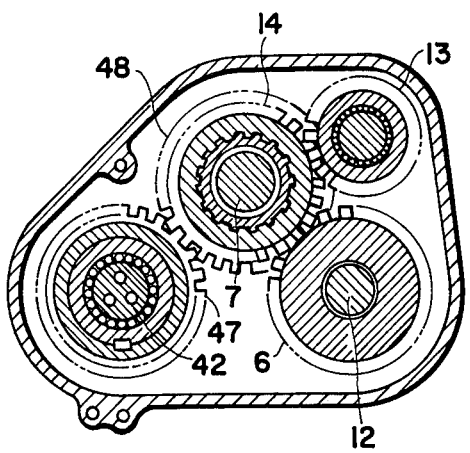
FIG. 3 is a sectional view of the embodiment of FIG. 1 taken along the line III—III.

Reference will now be made in detail to the present preferred embodiment of the invention, an example of which is illustrated in the accompanying drawings.

Referring first to FIGS. 1 to 5, there is shown an example of a power dividing type hydraulic transmission system in which the present invention is embodied.

As here embodied and depicted in FIGS. 1 through 4, a shaft 2 from an engine 1 is connected through intermeshed gears 3 and 4 to an input shaft 6 integral with the cylinder barrel 5a of a variable capacity type hydraulic pump motor 5. The shaft 6 is, in turn, connected to an output shaft 8 through a forward and reverse changeover device 10, an input shaft 7 and a differential gear unit 20. The forward and reverse changeover device 10 shown in detail in FIGS. 1 and 4 consists of a gear 11 having an outer spline 11a and spline-fit to the shaft 6 so as to be movable in the axial direction. A gear 12 is provided adjacent the gear 11, the gear 12 having an inner spline 12a engageable with the outer spline 11a of the gear 11. A counter gear 13 is capable of engaging the gear 11, and a gear 14 is integrally coupled to the intput shaft 7 and normally meshed with gears 12 and 13. Thus, a forward speed is provided when the gear 11 is moved to the right in the drawing to join the shaft 6 and the gear 12, and a reverse speed is obtained when the gear 11 is moved to the left to join the shaft 6 and the counter gear 13.

Figure 4:
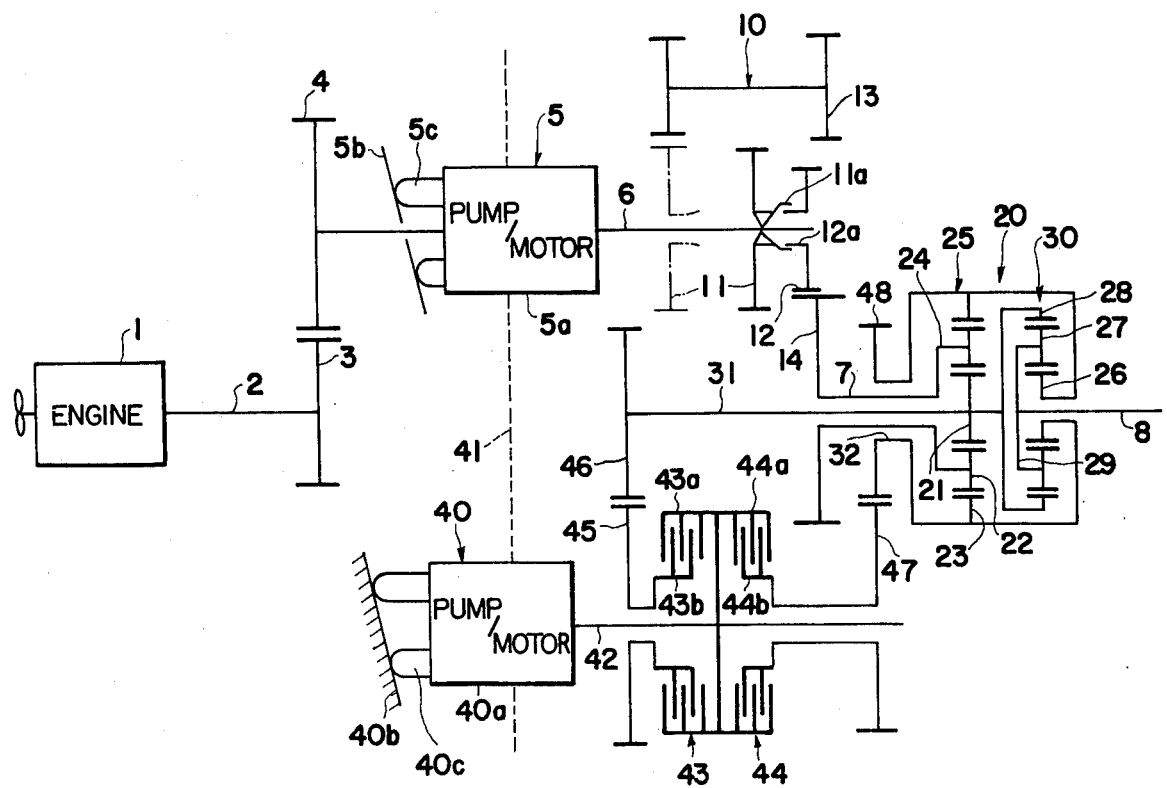
FIG. 4 is a schematic diagram of the transmission shown in FIGS. 1-3.

The gear unit 20 as embodied in FIGS. 1 and 4 consists of two single planetary gear assemblies 25 and (30) each of which comprises a sun gear 21 (26), a pinion 22 (27), a ring gear 23 (28) and a carrier 24 (29) pivotally supporting the pinion 22 or 27. One carrier 24 is connected to the input shaft 6 and the other carrier 29 to the output shaft 8, while the sun gear 21 and ring gear 28 are connected to a reaction shaft 31, which serves as a reaction element in the low speed ratio range. Another sun gear 26 and ring gear 23 are connected to another reaction shaft 32 which serves as a reaction element in the high speed ratio range. Rotation of these reaction shafts 31 and 32 are controlled to obtain the speed ratio ranges of low-speed gear ratio and high-speed gear ratio calculated from the gear ratios of both planetary gears 25 and 30.

As here embodied, the hydraulic pump motor 40 is connected to the hydraulic pump motor 5 by way of a hydraulic circuit 41 so that a flow of oil is permitted to circulate therebetween. The hydraulic pump motor 5 is of a variable volume type and arranged such that its cylinder barrel 5a is rotated by the engine output. The stroke of the plunger 5c can be varied by adjustment of the swash plate 5b so as to vary the displacement volume of the pump motor. By contrast, the hydraulic pump motor 40 is of a fixed volume type, and the stroke of the fixed plunger 40c defined by the swash plate 40b and the displacement volume is always kept constant. The rotational speed of the drive shaft 42 coupled to the cylinder barrel 40a changes in accordance with the direction and volume of oil flow between the pump motors. The drive shaft 42 is coupled with the clutch drums 43a and 44a of the two clutches 43 and 44, and the clutch hyb 43b of the low speed clutch 43, is connected to the reaction shaft 31 through the intermeshed gears 45 and 46, while the clutch hub 44b of the high speed clutch 44 is connected to the reaction shaft 32 through the intermeshed gears 47 and 48. The drive shaft 42 is connected either to the low speed gear ratio side or the high speed gear ratio side of the gear unit 20 through engagement of the clutches 43 and 44.

With the embodiment previously disclosed, the operation of the system is such that when the forward and reverse changeover device 10 is set at a forward drive position and the shaft 42 is connected to the reaction shaft 31 with engagement of the clutch 43, a low speed ratio range is provided. Under this condition, power from the engine 1 is transmitted to the input shaft 6 and causes the cylinder barrel 5a to rotate. When the swash plate 5b is in its maximum counterclockwise position the maximum position displacement of pump motor 5 is established whereupon pump motor 40 permits shaft 42 to rotate at a maximum velocity in a first direction. This causes sun gear 21 and ring gear 28 to rotate at a maximum velocity whereupon the speed of output shaft 8 is reduced to a minimum. As the swash plate 5b is shifted clockwise to gradually reduce the displacement volume ratio from its maximum value, a part of the power transferred to the carrier 24 from the input shaft is returned back to the input side by virtue of the motor action of the hydraulic pump motor 5 and the pump action of the hydraulic pump motor 40 to produce a reaction force in the sun gear 21 and ring gear 28 as the rotation of these gears slows. The remaining power from the carrier 24 is transmmitted to the output shaft 8 through the planetary gears 30. As this stage is reached, rotations of the shaft 42 of the hydraulic pump motor 40, ring gear 28 and other associated elements are gradually lowered to approach zero in accordance with decrease of hydraulic power of the hydraulic pump motor 5, and thereby the speed of the output shaft 8 is further increased. When the displacement volume ratio of the hydraulic pump motor 5 is finally zeroed to shut off any flow of oil between pump motor 5 and pump motor 40, both sun gear 21 and ring gear 28 integral with the reaction shaft 31 are locked to allow all of power from the input shaft 7 to be mechanically transmitted to the output shaft 8.

When the swash plate 5b of the hydraulic pump motor 5 is inclined in the opposite direction to render the displacement volume ratio negative, the hydraulic pump motor 5 performs as a pump while the hydraulic pump motor 40 performs as a motor and begins to rotate in the opposite direction. The power mechanically converted by the hydraulic pump motor 40 is conducted from the shaft 42 to the sun gear 21 and ring gear 28 contrariwise through clutch 43, reaction shaft 31, etc., to multiply speed of the gears. Consequently, the speed of the output shaft 8 is further increased by virtue of the power supplied to the carrier 24 from the input shaft 7 and the power supplied from pump motor 40 through the sun gear 21 and ring gear 28. When the displacement volume ratio of the hydraulic pump motor 5 reaches the maximum negative value, the clutch drum 44a of the clutch 44 rotating with the clutch 43 is synchronized with the clutch hub 44b which is driven by ring gear 23 through the reaction shaft 32 and gears 47 and 48. The speed ratio at this moment is called the mode conversion speed ratio ($e^*$). In the case of the output shaft 8 and the input shaft 7, the value of such speed ratio is 1.0, while in the case of output shaft 8 and engine shaft 2, such value in a preferred embodiment is approximately 0.6 and is determined by the gear ratios between the gears 3 and 4 to the gears 11 and 14. Therefore, if the clutch 44 is engaged and the clutch 43 released at this mode conversion speed ratio, the shaft 42 is connected to the reaction shaft 32 to establish a high speed ratio range.

When the high speed ratio range is reached, the hydraulic pump motor 40 again starts to perform as a pump while the hydraulic pump motor 5 begins to perform as a motor, and as the displacement volume ratio of the hydraulic pump motor 5 approaches to zero from its negative value, the ring gear 23 and sun gear 26 are now reduced in speed along with the shaft 42 and reaction shaft 32 as power is conducted similarly from the input shaft 7 to the carrier 24. Therefore, the speed of the output shaft 8 is increased from the mode conversion speed ratio ($I^*$) owing to high speed gear ratio of both planetary gears 25 and 30. When the displacement volume ratio of the hydraulic pump motor 5 is returned to zero to cut off the flow of oil between pump motor 40 and pump motor 5, the ring gear 23 and sun gear 26 are locked together with the drive shaft 42 and reaction shaft 32, thus again allowing power from the input shaft 7 to be mechanically transmitted in its entirety to the output shaft 8.

If the displacement volume ratio of the hydraulic pump motor 5 is then increased gradually from zero under the positive state by counterclockwise tilting of the swash plate 5b, the hydraulic pump motor 5 now performs as a pump and the hydraulic pump motor 40 as a motor to increase the speed of the ring gear 23 and sun gear 26 in the reverse direction through shaft 42, reaction shaft 32 and other associated members, thus further multiplying speed of the output shaft 8 with additional supply of volume to the carrier 24. When the displacement volume ratio reaches its maximum positive value, the rotating speed of the output shaft 8 becomes substantially equal to that of the engine shaft 2. In both cases of increasing the speed ratio and decreasing it, speed control can be accomplished similarly by perfectly reversing the displacement volume ratio of the hydraulic pump motor 5 and the pattern of changeover of the clutches 43 and 44.

When the forward and reverse changeover device 10 is switched into reverse drive to rotate the input shaft 7 in an opposite direction by the counter gear 13 and the displacement volume ratio of the hydraulic pump motor 5 is varied from its maximum negative value to zero and then to the maximum positive value, the shaft 42 is connected to the reaction shaft 31 on the low speed gear ratio side through engagement of the clutch 43. The rotating direction of the respective rotational members of the gear unit 20 is also turned in an opposite direction to that of the forward drive, and thereby the output shaft 8 is reversed in its direction of rotation and increased in speed.

A hydraulic control circuit is provided for effecting the application and release of the clutches 43 and 44. As here embodied and depicted in FIG. 5, the hydraulic control circuit comprises an oil line 51 which extends from a hydraulic pressure source 50 which produces a required hydraulic pressure. The line 51 is connected to a low clutch changeover valve assemby 60 as well as to a high clutch valve assembly 70. Extending from the changeover valve assembly 60 is an oil line 52 which is connected to a servo 43' adapted to operate the low clutch 43, and an oil line 53 extending from the changeover valve assembly 70 is connected to a servo 44' adapted to operate the high clutch 44. There are also provided solenoid valve 80 and 90 in the changeover valve assemblies 60 and 70 respectively.

The changeover valve assembly 60 comprises a spool 62 arranged movable with a spring 61 being loaded on one side thereof, ports 63 and 64 connected to the oil lines 51 and 52, respectively. A drain port 65, an oil chamber 67 are connected to an oil line 66 branched off from the line 51 and are designed to act as hydraulic pressure to the other side of the spool 62 against the force of the spring 61. Orifices 68 and 69 are provided in the oil line 66 and the oil chamber 67, respectively. The solenoid valve 80 provided in the changeover valve assembly 60 consists of a plunger 82 arranged to open or close the orifice 69 with a spring 81 being loaded on one side thereof, and a coil 83 wound around said plunger 82. When power is connected to the coil 83, the plunger 82 is moved back to open the orifice 69, whereby pressure in the oil chamber 67 in the changeover valve assembly 60 is discharged out to let the spool 62 move to the right while communicating the ports 63 and 64.

On the other hand, if the coil 83 is disconnected from power, the plunger 82 is now moved forward by the spring 81 to close the orifice 69, whereby oil pressure is built up in the oil chamber 67 in the changeover valve assembly 60 forcing the spool 62 to move to the left while communicating the port 64 with the drain port 65.

Another changeover valve assembly 70 and the solenoid valve 90 provided therein are of the same arrangement as the counterparts described above. The changeover valve assembly 70 consists of a spool 72 loaded with a spring 71 on one side thereof, ports 73 and 74 connected to the oil lines 51 and 53 respectively, a drain port 75, an oil chamber 77 connected to a line 76 branched off from the line 51 and orifices 78 and 79, while the solenoid valve 90 consists of a plunger 92 loaded with a spring 91 on one side thereof and a coil 93. When the coil 93 is energized upon connection to power, pressure in the oil chamber 77 is discharged out to let the spool 72 move to the right to communicate the ports 73 and 74, and when the coil 73 is disenergized, the spool 72 is now moved to the left by oil pressure in the oil chamber 77 to communicate the ports 74 and 75.

Thus, when the coil 83 is energized and the coil 93 disenergized, oil pressure in the line 51 is supplied into the servo 43' through ports 63 and 64 in the changeover valve assembly 60 and then through the line 52, while pressure in the servo 44' is discharged out through the line 53 and drain port 75 in the changeover valve assembly 70, whereby the clutch 43 alone is engaged to establish a low speed ratio. By contrast, if the coil 83 is disenergized and the coil 93 energized, oil pressure in the oil line 51 is now supplied into the servo 44' through ports 73 and 74 in the changeover valve assembly 70 and then through the line 53, while pressure in the servo 43' is discharged out through the line 52 and drain port 65 in the changeover valve assembly 60, whereby the clutch 44 alone is engaged to provide a high speed ratio range.

Figure 5:
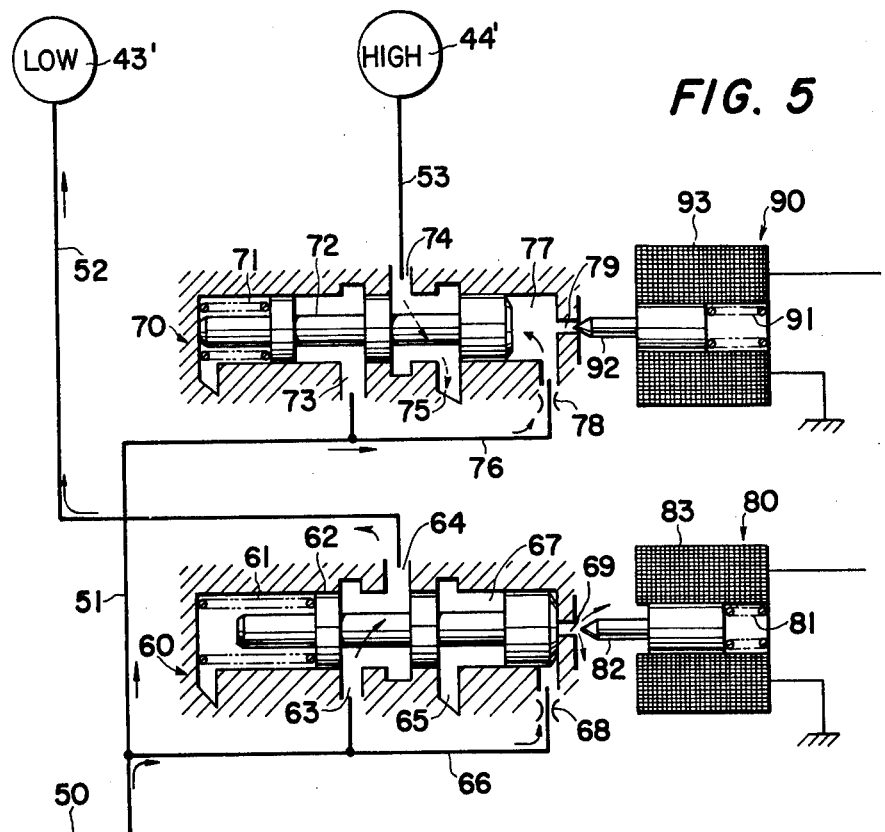
FIG. 5 is a circuit diagram showing the preferred embodiment of a hydraulic control circuit for use with the present invention.

Described in terms of flow, the preferred embodiment of valve assemblies of FIG. 5 are comprised (using as an example the lower valve assembly of FIG. 5) of a valve body having an axial bore, two input ports 63 and 68, one output port 64, two vents 65 and 65', a solenoid valve orifice 69 opened and closed by a solenoid 80. A spool 62 within the axial bore has three spaced sealing members forming three flow passages with one of the sealing members also sealing a vented spring cavity. As full spring extension, hydraulic pressure is passed through the inlet port 63 through the flow passage to a clutch servo 43'. A second flow passage is vented through 65 and the sealing member adjacent the solenoid orifice 69 eliminates the flow passage by its presence. At full spring compression, the solenoid orifice 69 is closed and hydraulic pressure from the source 50 through inlet port 68 forcing the spool 62 against the spring 61. In that configuration, a flow passage in the spool 62 aligns the clutch servo 43' outlet port 64 with the vent 65. The remaining flow passage is aligned with the inlet port 63 only. In that manner, hydraulic pressure from the source 50 is applied to and vented from the clutch servo 43' in response to the position of the solenoid 80. The function of the valve assembly 70 is analogous to that of the valve assembly 60.

In accordance with the invention, an electrical control system for the hydraulic transmission detects the rotational speeds of the output shaft 8 and the input shaft 2 to establish a ratio $e$ that is used to change the selection of speed ratios of the transmission utilizing the afore-mentioned hydraulic control system. When the transmission changes from the low speed to the high speed ratio range, it is undergoing mode conversion.

As here embodied, the low clutch 43 and the high clutch 44 are always in the following relationship:

|  | low speed ratio range | high speed ratio range |
|---|---|---|
| low clutch 43 | on | off |
| high clutch 44 | off | on |

When the speed ratio range $e$ is at the mode conversion point $e^*$, hydraulic pressure is supplied to or discharged from the low clutch 43 and the high clutch 44 depending upon whether the transmission is shifting from the low speed ratio to the high speed ratio or from the high speed ratio to the low speed ratio. The two conditions of engagement of the clutch at values of $e$ remote from $e^*$ are indicated in the above table. However, at the mode conversion point $e^*$, both the clutches 43 and 44 for the operation of the control system could be disengaged for a short time $\Delta T$, resulting in the occurrence of the undesired neutral state of engagement and an attendant rapid increase in the rotational speed of the engine.

Figure 6:
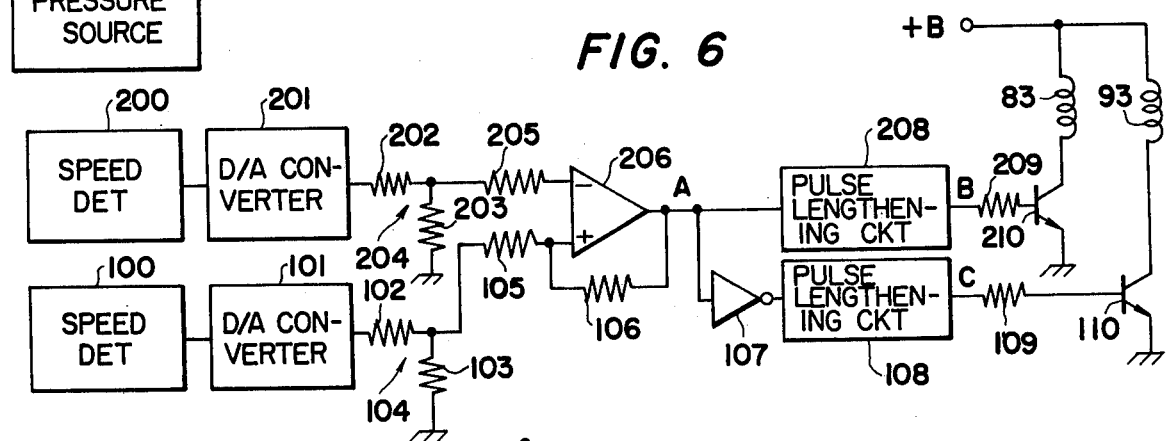
FIG. 6 is a circuit diagram showing the preferred embodiment of an electric control circuit for the invention.

In accordance with the invention, the electrical control circuit comprises a pair of detectors that generate separate outputs dependent upon the speed of rotation of the input and output shafts, respectively. The comparison of the two shaft speeds results in the mode conversion. As here embodied and depicted in FIG. 6, the detector 100 detects the rotational speed of the driven input shaft 2. Associated with the detector 100 is a digital-to-analog (D/A) convertor 101 for conversion of the signal from the detector 100 to analog output. An output shaft rotation detector 200 detects the rotation of the output shaft 8 and an associated D/A convertor 201 converts the signal from the detector 200 to an analog signal.

Preferably, a voltage divider 104 divides the output voltage from the D/Ad convertor 101 and includes resistances 102 and 103. Another voltage divider 204 divides the output voltage from D/A convertor 201 and includes resistances 202 and 203. Resistances 105 and 205 are included in the circuit paths transmitting the output signals from the voltage dividers 104 and 204, respectively, to a comparator 206. A resistance 106 is located between the output side and the positive input of the comparator 206 to provide hysteresis.

The output (A in FIG. 6) of the comparator 206 is a control signal which appears as a positive or negative-going transition in the signal level at the output of the comparator. The control signal is introduced into a signal retarding means shown as pulse lengthening circuit 108 (also known as a rising-retarding circuit) through an inverter 107 and, the output of circuit 108 is applied to a power transistor 110 through a base resistance 109. The output of the comparator 206 is also introduced into another pulse lengthening circuit 208 (also termed a rising-retarding circuit) and put into a power transistor 210 through a base resistance 209. Coils 93 and 83 of the solenoid valves 90 and 80 form the output load of the power transistors 110 and 210, respectively. Circuits 108 and 208 are a well-known type of digital logic circuit. Besides being known as a pulse lengthening circuit and a rising-retarding circuit, this type of circuit is sometimes also referred to as a trailing edge delay circuit. Positive-going transitions presented to the circuit input are manifested essentially instantaneously at the output. However, negative-going transitions applied to the input are delayed and do not appear at the output until after a predetermined dekay interval has elapsed. The delay interval is defined as $td_1$ for circuit 208 and as $td_2$ for circuit 108 (FIG. 7).

The operation of the electrical control circuit of the present invention is best disclosed in relation to its response to the changing values of e (the ratio of the speed of the output shaft 8 over the speed of the input shaft 2). The values of voltage dividers 204 and 104 are set so that the comparator 206 does not produce an output signal when the value of e is equal to or greater than the mode conversion speed ratio $e^*$. The output of the comparator 206 is shown as A in FIGS. 6 and 7.

Figure 7:
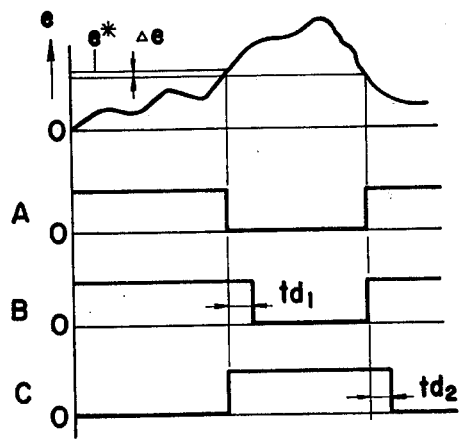
FIG. 7 is a diagram showing the performance of the electrical control circuit of FIG. 6.

Under conditions where the output shaft 8 is not rotating, the value of $e$ is zero as illustrated in FIG. 7. When the value of $e$ is zero, the output of the comparator is 1 (A in FIG. 6) and hence the output of the pulse lengthening circuits 108 and 208 (C and B in FIG. 6) are zero and 1, respectively. Under such conditions, the power transistor 110 does not conduct and the solenoid 93 is not energized while the power transistor 210 does conduct and the solenoid 83 is energized.

When the rotation of the output shaft 8 is increased so that the value of e is greater than or equal to $e^*$, the output of the comparator 206 is reversed and becomes zero. Under these conditions, the power transistor 210 which had been previously providing an output is cut off after a time lag $T_{db}$ the increased pulse length induced by circuit 208. At the same time, power transistor 110 which has been kept in the off state is immediately energized through the inverter 107 and the pulse lengthening circuit 108.

When the rotational speed of the input shaft is reduced to establish a relation of $e \leq e^* - e$, the output of the comparator 206 is reversed and again becomes 1. Accordingly, the power transistor 110 which had been kept in the activated state is cut off after a time lag $T_{d2}$ induced by the pulse lengthening circuit 108, while the power transistor 210 which has been kept in the off state is immediately energized through the pulse lengthening circuit 208.

It should be apparent from the foregoing illustration that by operation of the electrical control circuit by energizing one of the solenoids 83 and 93 and de-energizing the other solenoid, it may be possible to perform the changeover of the on and off states in both clutches 43 and 44 after both the clutches have been kept in the on state for a certain time lag ($T_{d1}$ or $T_{d2}$). When the speed ratio is in the range of the mode conversion ratio of $e^*$, therefore, the simultaneous disengagement of the clutches 43 and 44 at the time of mode conversion can be prevented thereby preventing abrupt increases in the rotational speed of the engine driving such a transmission.

The present invention has been disclosed in terms of a preferred embodiment and one skilled in the art can make substitutions and modifications of the invention without departing from the scope of the invention as defined by the appended claims.

What is claimed is:

1. In a transmission system utilizing a differential gear set having a high speed transmission path and a low speed transmission path for coupling power from an input shaft to an output shaft, said gear set being operably connected to selectively controllable, variable displacement hydraulic pump-motor speed control means constructed and arranged to supply a selectively variable speed control input to said differential gear set to adjust the speed ratio thereof, the combination comprising:
   a. first clutch means operable when engaged to couple said speed control means to said gear set to control the speed ratio of said high speed transmission path;
   b. second clutch means operable when engaged to couple said speed control means to said gear set to control the speed ratio of said low speed transmission path;
   c. means for producing speed signals representative of the rates of rotation of said output shaft and said input shaft, respectively; and
   d. control means responsive to said speed signals for controlling the engagement and disengagement of said first and second clutch means, said control means being constructed and arranged to cause one of said clutch means to engage and the other of said clutch means to disengage when said speed signals attain a predetermined ratio indicating that the components of said high and low speed transmission paths are operating at a common speed; and
   e. retarding means for delaying the disengagement of said disengaging clutch means so that both said first and second clutch means are temporarily engaged for a period of time immediately following the time when said speed signals attain said predetermined ratio.

2. The system of claim 1 wherein said control means includes circuit means for producing a control signal when said speed signals attain said predetermined ratio, one of said clutch means being engaged in response to said control signal, and inverting means for inverting said control signal, the other of said clutch means being disengaged in response to the output of said inverting means.

3. The system of claim 2 wherein said retarding means includes means for delaying the signal presented at the output of said inverting means.

4. The system of claim 2 wherein said circuit means comprises a pair of voltage dividers for individually receiving said speed signals and comparator means having inputs connected to be driven by said voltage dividers and adapted to generate said control signal when said inputs represent substantially equal values.

5. The system of claim 3 wherein said control means further includes driving means comprising first and second transistor switch means adapted to be controlled by said signals from said circuit means and said inverting means, and first and second clutch-control solenoids driven by said first and second transistor switch means respectively.

6. The system of claim 5 wherein said means for producing said speed signals includes means individual to each of said shafts for sensing the rate of rotation of said shafts and a pair of digital-to-analog converters individually responsive to said sensing means for generating said speed signals.

7. The system of claim 5 including hydraulic servo means for controlling engagement and disengagement of said clutch means wherein said solenoids control the application of hydraulic pressure to said servo means.

8. The system of claim 7 including hydraulic pressure control means having first and second changeover valves, each of said changeover valves including a solenoid valve responsive to said first and second solenoids respectively, said hydraulic control means applying hydraulic pressure to said servo means in response to signals applied to said solenoids.

9. The system of claim 8 wherein said changeover valves each include a valve body, a sliding spool within said valve body and a spring biasing said spool to one end of said body in a position to pass hydraulic pressure through said valve body to means for engaging a clutch, said valve body including said solenoid valve wherein said hydraulic pressure is passed to said clutch servo means only when said solenoid valve is open, closure of said solenoid valve causing said spool to move within said valve body to full spring compression by hydraulic pressure with hydraulic pressure being vented from said servo means engaging said clutch.

10. The system of claim 9 wherein said valve body of said changeover valve having an axial bore, two input ports, one output port, two vents, a solenoid valve orifice, the opening and closing of said solenoid valve orifice being controlled by said solenoid valve; said spool within said axial bore having three spaced sealing members, a first sealing member forming a first flow passage, a second sealing member displaced from said first sealing member to provide a second flow passage and a third sealing member to form a third flow passage, said third sealing member also forming a spring cavity having a first vent; said flow passages being arranged within said valve body so at full spring extension hydraulic pressure is passed through a first input port through said third flow passage to said servo means engaging a clutch, while said second flow passage is exposed to a second vent and said first flow passage is eliminated by the presence of said first sealing member, full compression of said spring placing said spool within said valve body so said first flow passage connects said solenoid valve orifice in a closed configuration with said source of hydraulic pressure through a second input port, with said second flow passage connecting said servo means through said outlet port to said second vent, and said third flow passage leading only to said first inlet port.

* * * * *